United States Patent Office 2,907,074
Patented Oct. 6, 1959

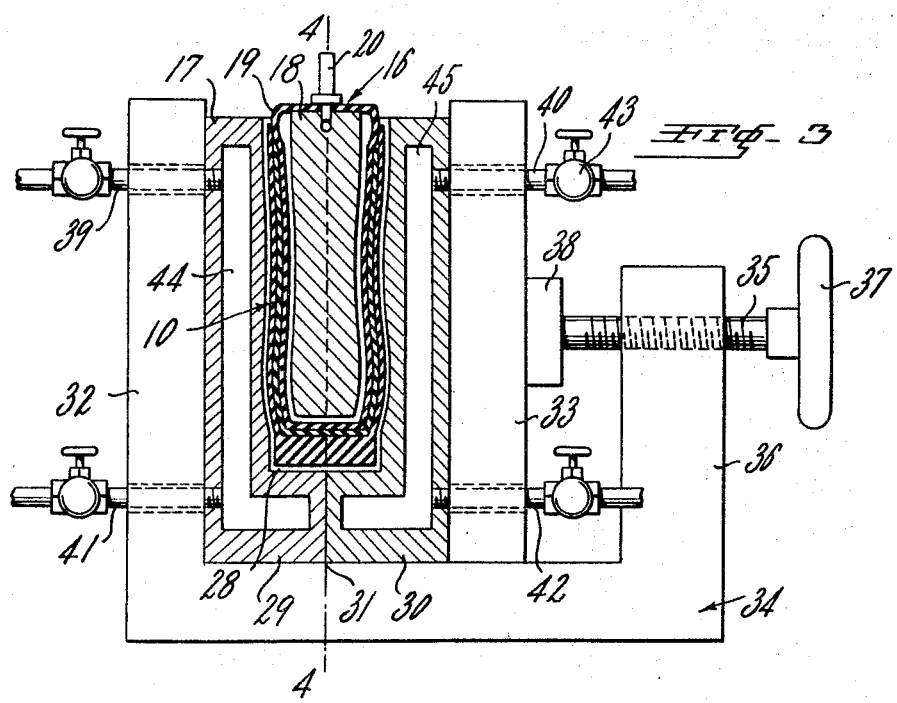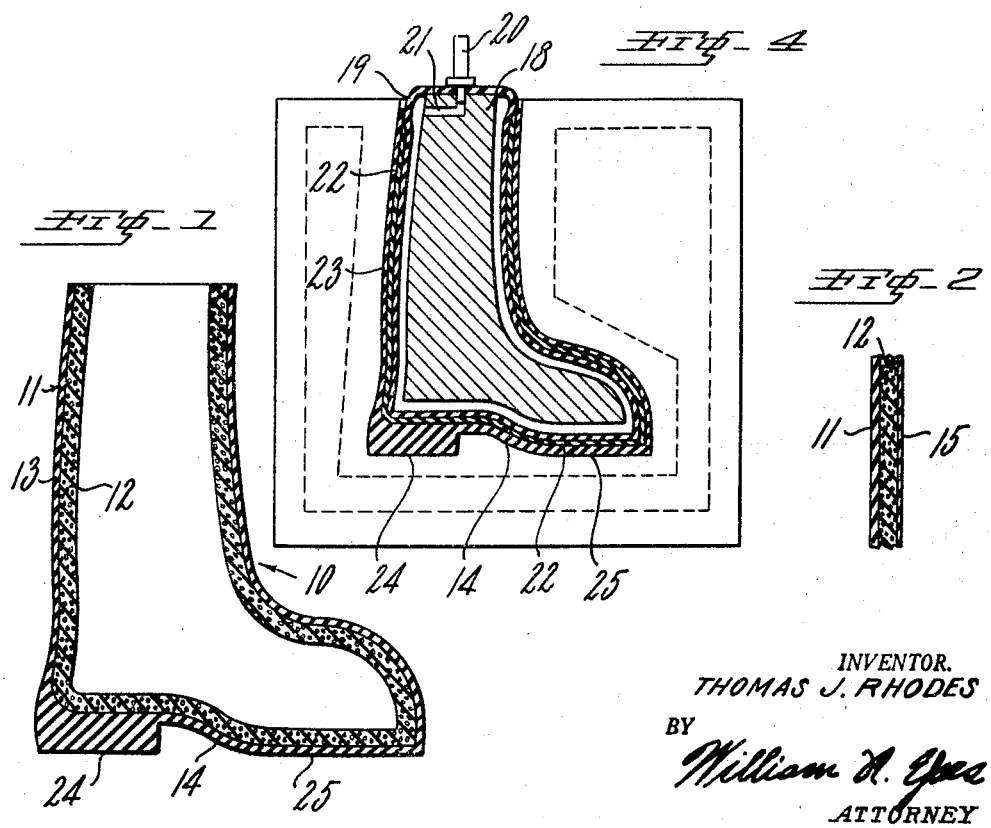

2,907,074

METHOD OF MANUFACTURING A CELLULAR LINED PLASTIC ARTICLE

Thomas J. Rhodes, Clifton, N.J., assignor to United States Rubber Company, New York, N.Y., a corporation of New Jersey Application July 22, 1953, Serial No. 369,674

3 Claims. (Cl. 18—59)

This invention relates to a method of making a waterproof article of footwear having a protective solid, flexible, waterproof, organic plastic outer shell, such as rubber, and an inner lining of non-water-absorbent, soft, flexible, heat insulating organic plastic material intimately bonded to said shell and having an expanded cellular structure, the majority of the cells of which are relatively small and non-communicating. Such insulating material being hereinafter referred to as closed cell cellular material.

The boot made according to this invention is particularly useful in extremely cold climates, because the closed cell cellular organic plastic material has excellent heat insulating properties regardless of whether or not it comes in contact with water or moisture which may be conveyed thereto from the exterior or interior of the boot. Heretofore water absorbent fibrous and sponge rubber materials have been used for lining boots but such materials are not as good heat insulators as closed cell cellular rubber, because air can circulate through the internal structure of the fibrous and sponge materials. Furthermore, such water absorbent materials become less efficient as heat insulators when they come in contact with water or moisture because the absorbed water either replaces or moistens the air normally retained in such materials, and the water and/or moist air therein is less efficient as a heat insulator than the replaced dry air.

It has also been proposed to utilize closed cell cellular rubber for insulating footwear having a leather exterior shell, but in such cases the cellular lining material was not bonded to the protective, heat conductive leather shell of the article, and the water could penetrate the leather and collect between the lining and the leather shell. The collected water has the effect of causing the shoe to deteriorate and of depreciating the heat insulating value of the closed cell cellular material.

In accordance with the present invention the closed cell cellular lining is intimately bonded to a protective outer waterproof shell, which protects the lining from wear and exterior water, and in the event the bonded waterproof exterior shell of the footwear be punctured the exterior water cannot penetrate and collect between the shell and the lining and thereby cause the shoe to deteriorate.

The closed cell cellular lining material may be preformed and subsequently incorporated in the shoe embodying this invention. However, in the practice of the method of making the footwear, it is preferred to produce the cellular structure of the lining by expanding heat curable plastic containing a blowing agent in contact with the waterproof protective outer shell and intimately bonding it to the shell in simultaneous operations. More specifically in the practice of the method, a layer of raw uncured vulcanizable rubber stock containing a blowing agent adapted to produce a closed cell structure is applied to the interior of an outer shell of a solid, flexible, uncured vulcanizable rubber stock, and the two layers of rubber are simultaneously heated and cured under a regulated temperature and pressure to cause the closed cell cellular structure of the lining to be formed and bonded to the outer shell. Such vulcanizable rubber stock containing the blowing agent is hereinafter referred to as expandable rubber.

Still more specifically, the article of footwear is manufactured by applying a layer of the expandable stock to an inflatable last having a solid core. A solid or conventional layer of vulcanizable rubber stock, free from any blowing agent, is then formed over the expandable rubber layer. The inflatable last with the two layers formed thereon is then inserted in a mold. The inflatable last is inflated to force the outer shell against the walls of the mold and apply a controlled pressure to the inner, expandable rubber layer. The assembly is then heated to cause the formation of the closed cells in the inner layer and bring about the vulcanization of the inner and outer layers.

For a better understanding of this invention reference should be had to the following description and the accompanying drawings, which illustrate an article of footwear embodying the invention and the manner in which the method of making such article is practiced. In the drawings:

Fig. 1 is a vertical section of a boot made according to this invention taken through the heel and toe;

Fig. 2 is a cross-section of a portion of the wall of an upper of a modified form of the boot shown in Fig. 1;

Fig. 3 illustrates the method of making the boot shown in Fig. 1, and is a transverse sectional view of a partly inflated last having the uncured rubber stocks applied thereto to form the insulated boot shown in Fig. 1, and in which the last is enclosed in a curing mold; and Fig. 4 is a vertical sectional view of the last and mold shown in Fig. 3 taken on line 4—4 therein, but showing the last fully inflated.

As shown in Fig. 1, the article of footwear 10 made according to this invention is shown in the form of a boot having a protective outer shell 11 of solid, flexible, waterproof, organic plastic, which may be a conventional rubber composition used in the manufacture of waterproof footwear. The boot 10 is provided with a heat insulating inner lining 12 of non-water-absorbent, soft, flexible, expanded organic plastic material, which is chemically compatible with and intimately bonded to the shell 11. The shell 11 includes the upper 13 and the tread, or sole, portion 14 of the boot, and it is a continuous unitary construction. The lining 12 is adapted to cover all, or such portions of the inner surface of the shell as may be required to provide the desired heat insulating characteristics to protect the foot of the wearer.

The boot 10 may be modified as shown in Fig. 2 by providing the cellular lining 12 with an inner protective layer 15 of solid flexible organic plastic material which is chemically compatible with the cellular lining 12 and bonded thereto. The layer 15 is also non-water-absorbent, and may be applied over the entire area of the lining 12, or over such portions as may be required to protect the cellular material from wear by the foot. All parts of the boot are intimately bonded together to prevent voids in the wall structure of the upper 13 or tread portion 14 of the boot which might otherwise collect water, or moisture, and prevent the boot from being quickly dried in the event it should become wet either from the perspiration of the foot, or from the entry of water from the outside over the top of the boot.

Figs. 3 and 4 illustrate the method of practicing the invention for the manufacture of the boot shown in Figs. 1 and 2. In the practice of the method, the boot 10 is built up on an inflatable last 16 from raw or uncured plastic layers. The boot 10 is then placed in a vulcanizing mold 17 and cured under a confining pressure between the mold and the last 16.

The last 16 comprises a solid core 18 and an inflatable outer cover 19. The core 18 of the last is made of a suitable material for stabilizing and supporting the flexible inflatable outer cover 19, which completely encloses the core, and is attached to the top of the core only. The interior surface of the cover 19 is adapted to be spaced from the exterior surface of the core 18 by inflating the cover 19 through an inlet 20 with a suitable fluid, such as air or water. The fluid passes from the inlet 20 under pressure through an L-shaped conduit 21 in the core 18 and is discharged into the space between the core and the cover 19.

The cover 19 is elastic and, when not inflated, it is adapted to fit the core 18 snugly. When the cover so fits the core 18, the last 16 is of the size required for the finished boot. The cover 19 is partly inflated to provide space for the expansion of the expandable stock of the boot lining. The parts of the boot are built up on the last 16 while it is so inflated. A layer 22 of uncured expandable rubber stock (which when expanded forms the cellular lining 12 of the boot) is applied to the cover 19, which may be treated with a soap solution, or in any other conventional manner to prevent the stock from being bonded thereto. The expandable layer 22 is applied in the conventional manner by cutting the various parts of the layer from a calendered sheet in suitable shapes to be fitted around the cover 19. The cut parts may be applied in various thicknesses, so as to insulate the boot to a greater or lesser amount in the places where so desired, and the parts are united so as to form a waterproof lining and so that there will be no break in the insulation, excepting in the places where no insulation is desired. Preferably the lining stock is expandable to a volume equal to about five times its original volume, and it is applied in the proper thickness to produce the desired blown thickness of expanded insulation.

A conventional layer 23 of vulcanizable rubber compound containing no blowing agent is then applied to the expandable layer 22 in the usual manner to form the upper portion of the outer shell 11, which protects the cellular layer in the finished boot. The parts forming the outer layer 23 are cut from uncured calendered sheet stock, in convenient shapes to economically and conveniently fit the exterior shape of the boot in accordance with standard practice. The tread 14, comprising a heel portion 24 and a sole portion 25, is then applied to the bottom of the last, which may be united by means of a foxing, if desired, to the thinner layer 23 forming the outer shell of the shoe upper 13 according to the usual practice. It is desirable that the usual insole construction (not shown) be applied to the bottom of the last over the expandable stock 22 at the bottom of the last and that the bottom edge of the thin layer 23 of rubber compound be turned over the insole in accordance with conventional practice.

The boot 10 thus built up on the last 16 is placed into the split mold 17 having a cavity 28 adapted to receive the boot 10, and which has been suitably treated or lubricated so as to prevent the boot from adhering to the walls of the mold cavity, in accordance with conventional practice.

In order to facilitate the insertion of the last 16 with the built up boot thereon into the mold cavity 28, the mold 17 is made in two parts 29 and 30, which fit together along the vertical plane passing through the mold cavity 28 from heel to toe, as represented by line 4—4 in Fig. 3. The mold 17 is held between a stationary head 32 and a movable head 33 of a press 34. The movable head 33 is operated by a screw 35 which is threaded into a projection 36 of the press. One end of the screw is provided with a hand wheel 37, and the other end is swiveled in a block 38 attached to the mold part 30.

In order to place the last 16 with the built up boot thereon in the mold cavity 28, the movable head 33 is moved away from the stationary head 32 by turning the hand wheel 37. After the mold parts 29 and 30 have been separated a sufficient distance to permit the insertion of the boot 10 in the cavity 28, the boot is placed therein, and the mold is then brought together around the boot by turning the hand wheel 37 until the mold parts are brought in close contact with each other under the pressure of the screw 35. When the mold is closed as shown in Fig. 3, the boot 10 may have a slight spacing from the sides of the mold cavity 28. Fluid pressure is then admitted to the inlet 20 of the last 16, to further inflate the cover 19 and force the layers of rubber together and to cause the outer surface of the boot to take the imprint of the mold, and also to place the cellular producing layer 22 under the pressure required to produce the closed cell cellular structure therein. After the cover 19 has been thus inflated, the boot 10 assumes the position in respect to the mold 17 as shown in Fig. 4.

The mold 17 is then heated to cure the several layers of rubber stock and to blow the inner layer 22. For that purpose, the mold parts 29 and 30 are each equipped with steam inlet pipes 39, 40 and steam or steam condensate outlet pipes 41 and 42. The inlet and outlet pipes are equipped with cut off valves 43. The steam inlet pipes 39 and 40 deliver steam to the chambers 44 and 45 of the mold parts 29 and 30, and the pipes 41 and 42 discharge the steam or condensate from the chambers to heat the mold and thereby cure the layers of rubber in the boot 10.

In the curing operation referred to immediately above, the layers of rubber are given a partial pre-cure at a temperature which is below the temperature required to generate gas in the lining layer 22 of rubber stock. Such pre-cure is for the purpose of rendering the expandable layer 22 sufficiently flow resistant to confine the gas in the individual or closed cells when the gas is generated in the rubber at a higher final curing temperature. When the pre-cure of the rubber layers has been completed, the cure of the layers is continued at a temperature which is sufficiently high to cause generation of gas in the layer 22 of rubber stock, and to complete the cure. As the gas is generated in the layer 22, it expands against the confining force of the pressurized cover 19 with sufficient pressure to collapse the cover onto the solid core 18.

After the expandable layer 22 has been expanded, and all the layers have been cured to the desired extent, the pressure within the cover 19 is released. The last 16 with the boot 10 thereon is then removed from the mold and the boot is stripped from the last in accordance with conventional practice. In some cases it may be desirable to cool the mold and thereby cool the cellular layer 12 before the mold is opened to release the boot, in order to prevent the cellular rubber layer 12 from being ruptured by the elevated pressure of the hot gas in the cells of the cellular layer.

The details of the above described method may be modified by those skilled in the art to make other hollow articles, or modified forms of footwear. For example shell-like or hollow bodies, such as gloves, and mittens having expanded closed cellular rubber linings may be made by substituting a different type of inflatable form for the boot last. More specifically the method can be used to apply the protective solid rubber layer 15 to the inner wall of the boot shown in Fig. 2. In that case a layer of solid rubber stock without any blowing agent is applied to the last 16 before the expandable layer 22 is applied, and the layers of the boot would be otherwise built up and cured as hereinbefore described.

It will also be understood that the details of the method as to pressures and temperatures used in the process will depend upon the rubber compounds used in the several layers of the article. With that in view a specific process will now be described in which the compounds Nos. 1 and 2 listed below are used in the layers 23 and 22 to produce the outer shell 11 and the insulating lining 12, respectively, of the boot shown in Fig. 1.

*Compound No. 1*

| Components: | Parts by weight |
| --- | --- |
| Pale crepe rubber | 100 |
| Whiting | 75 |
| Carbon black | 5 |
| Zinc oxide | 5 |
| Granular asphalt | 12 |
| Trimene base (accelerator)[1] | .75 |
| Sulfur | 2.5 |

[1] A reaction product of ethyl chloride, formaldehyde and ammonia.

*Compound No. 2*

| Components: | Parts by weight |
| --- | --- |
| Butyl rubber | 100 |
| Channel carbon black | 15 |
| Zinc oxide | 5 |
| Circo oil (light processed rubber softening oil) | 15 |
| Paraffin wax | 2 |
| Red litharge | .5 |
| Sulfur | 3 |
| Tetra-methyl thiuram disulphide (accelerator) | 1.5 |
| Selenium diethyldithiocarbamate (accelerator) | 1.5 |
| Zinc ammonia nitrite-bentonite paste (a blowing agent)[1] | 32.3 |

[1] The bentonite paste is ground to a smooth consistency, and is then mixed on the mill with the other ingredients after such ingredients have been mixed. The paste has the following composition:

| Components: | Parts by weight |
| --- | --- |
| Zinc ammonia nitrite | 40.0 |
| Ammonium hydroxide | 6.8 |
| Bentonite | 20.0 |

With the use of the above rubber compounds the process is carried out as follows. The inflatable cover 19 is partially inflated so that it is spaced approximately ¼ inch from the solid core 18. A layer of the expandable rubber compound No. 2 having a thickness of about 1/10 inch is applied over the cover 19. A layer 23 of the rubber compound No. 1 having a thickness of about 1/16 inch is then applied over the expandable layer 22. If an insole is to be built into the boot 10, the insole (not shown) is applied over the sole portion of the layer 22 before the layer 23 is applied, and the bottom edges of the layer 23 are turned over the insole material in accordance with conventional practice. The outsole, comprising the unitary sole and heel 25, 24 of the rubber compound No. 2, is then applied, and united to the outer layer 23 of the upper portion 13 of the boot by means of a foxing strip, or otherwise, so as to produce a waterproof joint.

The built up boot on the last 16 is now placed in the mold cavity 28, and the mold is closed around the boot 10. The inflating pressure inside the inflatable cover 19 is then increased to 80 to 100 p.s.i. to force the outer layer of rubber 23 against the walls of the mold cavity and thereby cause its outer surface to take the imprint of the mold, and to also compact the layers of rubber and place the expandable layer 22 under the desired pressure for producing the closed cell expanded structure required for the inner lining 12 of the boot.

The mold 17 is preheated to approximately 192° F. before the last 16 with the built up shoe thereon is inserted in the mold. The temperature of the mold 17 is gradually raised to 210° F. over a period of 22 minutes to partially pre-cure the layer 22 during which time the rubber stocks are slightly cured, but no gas is generated in the lining stock 22. The cure is continued for 24 minutes at a range of temperature from 210° F. to 230° F., during which time gas is generated in the lining layer 22, and this layer expands with sufficient pressure to collapse the inflated cover 19 against the solid core 18 in opposition to the pressure of 80 to 100 p.s.i. within the cover 19.

If it is desired to make the modified form of the wall of the boot as shown in Fig. 2 of the drawings, the inner layer 15 of solid protective rubber is made of the rubber compound No. 1, which contains no blowing agent, and is applied as a first layer to the last 16. The other layers of the boot then are built up over this first applied layer in the manner hereinbefore described, and the boot is otherwise manufactured in the same manner.

It will be understood that the several forms, and the method of practicing this invention have been described herein more or less in detail for the purpose of illustration. It is contemplated that changes may be made by those skilled in the art without departing from the spirit of this invention, and it is intended to cover such changes in the appended claims.

Having thus described my invention, what I claim and desire to protect by Letters Patent is:

1. The method of making a heat insulating hollow article comprising the steps of applying a layer of uncured expandable organic plastic to a partially inflated expandable form having a supporting core therein, applying an uncured non-expandable layer of organic plastic to the expandable layer, confining the form with the layers built up thereon in a mold cavity, increasing the pressure in the partially inflated form to force the last applied layer against the walls of the mold cavity, partially curing the layers of organic plastic without generating any substantial amount of gas in the expandable layer, continuing the cure of said layers at an elevated temperature, and generating gas in the expandable layer and thereby expanding said layer and collapsing said form against said core to limit the expansion of said expandable layer.

2. The method of making a closed cell cellular rubber lined article comprising the steps of applying a layer of uncured expandable rubber stock to a partially inflated expandable form having a supporting core therein, applying an outer uncured non-expandable rubber layer over the expandable layer, confining the partially inflated form with the layers of rubber thereon in a mold cavity, increasing the pressure of inflation within said form to force the outer layer of rubber against the walls of the mold cavity, partially curing the layers of rubber without expanding either of said layers, continuing the cure of said rubber layers at a higher temperature, whereby the expandable layer is expanded against the pressure within the inflated form and the form is collapsed against the supporting core and the cure of the layers of rubber is completed.

3. The method of making a heat insulating hollow article comprising the steps of applying a layer of uncured non-expandable organic plastic to a partially inflated expandable form having a supporting core therein, applying an intermediate uncured expandable layer of organic plastic over said uncured non-expandable layer, applying an outer uncured non-expandable layer of organic plastic over said expandable layer, confining the partially inflated form in a mold cavity, increasing the pressure of inflation within said form to force said outer layer against the walls of the mold cavity, partially curing the layers of organic plastic without expanding any of said layers, continuing the cure of said organic plastic layers at a higher temperature, whereby the expandable layer is expanded against the pressure within the inflated form and the form is collapsed against the supporting core and the cure of the layers of organic plastic is completed.

References Cited in the file of this patent

UNITED STATES PATENTS

| | | |
|---|---|---|
| 233,385 | Weeks | Oct. 19, 1880 |
| 878,749 | Schulze | Feb. 11, 1908 |
| 1,722,697 | Glidden et al. | July 30, 1929 |
| 1,758,438 | Glidden et al. | May 13, 1930 |
| 1,924,716 | Ferrettie | Aug. 29, 1933 |
| 2,202,042 | Blount | May 28, 1940 |
| 2,247,337 | Raflovich | June 24, 1941 |
| 2,287,026 | Craig | June 23, 1942 |
| 2,297,022 | Pfleumer | Sept. 29, 1942 |
| 2,299,593 | Roberts et al. | Oct. 20, 1942 |
| 2,394,327 | Niessent et al. | Feb. 5, 1946 |